(12) United States Patent
Takasaki et al.

(10) Patent No.: US 9,260,058 B2
(45) Date of Patent: Feb. 16, 2016

(54) SADDLE-RIDE TYPE VEHICLE

(71) Applicant: HONDA MOTOR CO., LTD., Tokyo (JP)

(72) Inventors: Atsushi Takasaki, Wako (JP); Satoshi Nishimura, Wako (JP); Kanji Hayashi, Wako (JP); Tomohiko Yashiro, Wako (JP); Takashi Takizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/612,569

(22) Filed: Feb. 3, 2015

(65) Prior Publication Data

US 2015/0217686 A1 Aug. 6, 2015

(30) Foreign Application Priority Data

Feb. 6, 2014 (JP) .................................. 2014-021288

(51) Int. Cl.
| | |
|---|---|
| *B62J 23/00* | (2006.01) |
| *B62K 11/02* | (2006.01) |
| *B60Q 5/00* | (2006.01) |
| *B60T 8/00* | (2006.01) |

(52) U.S. Cl.
CPC ... *B60Q 5/00* (2013.01); *B60T 8/00* (2013.01); *B62K 11/02* (2013.01)

(58) Field of Classification Search
CPC ............. B60Q 5/00; B60T 8/00; B62K 11/02
USPC ....................................... 296/78.1; 280/281.1
See application file for complete search history.

(56) References Cited

U.S. PATENT DOCUMENTS 8,687,835 B2 * 4/2014 Solow ...................... G10K 9/04
116/142 R

FOREIGN PATENT DOCUMENTS

| JP | 11-263264 A | 9/1999 |
|---|---|---|
| JP | 2012-162228 A | 8/2012 |

* cited by examiner

*Primary Examiner* — Pinel Romain
(74) *Attorney, Agent, or Firm* — Birch, Stewart, Kolasch & Birch, LLP (57) ABSTRACT

A technique to adequately provide a sound pressure of a horn that is less affected by a flow of air. In a motorcycle including a front cover for laterally covering a horn, the front cover includes an outer cover and an inner cover located inwardly of the outer cover in a vehicle-width direction. The inner cover includes an air guide surface extending in a vehicle-longitudinal direction. The horn is placed at the rear of the air guide surface. The inner cover further includes a relief portion leaning outwardly in the vehicle-width direction to steer clear of a vehicle forward side of the horn. The inner cover includes a covering provided on a surface contiguous with the air guide surface to cover at least a part of the vehicle forward side of the horn. The covering has a mesh structure.

20 Claims, 12 Drawing Sheets

EMBODIMENT

FIG. 11(a)

COMPARATIVE EXAMPLE

SADDLE-RIDE TYPE VEHICLE

CROSS-REFERENCE TO RELATED APPLICATIONS

The present application claims priority under 35 USC 119 to Japanese Patent Application No. 2014-021288 filed Feb. 6, 2014 the entire contents of which are hereby incorporated by reference.

BACKGROUND OF THE INVENTION

1. Field of the Invention

The present invention relates to an improvement in a saddle-ride type vehicle with a horn.

2. Description of Background Art

A technique for adjusting the sound pressure of a horn producing a warning sound has been suggested for a saddle-ride type vehicle. See, for example, JP-A No. H11-263264 (FIG. 4) and JP-A No. 2012-162228 (FIG. 6).

As shown in FIG. 4 of JP-A No. H11-263264, in a saddle-ride type vehicle, such as a motorcycle, lower pipes (18) (The numerals in parentheses indicate the numerals referred to in JP-A No. H11-263264. The same shall apply hereinafter.) extends downwardly from a head pipe (16). A horn (15) is placed between the lower pipes (18). A horn cover (53) for adjusting the sound pressure of the horn (15) is placed forward of the horn (15).

As shown in FIG. 6 of JP-A No. 2012-162228, a speaker (64) and a louver (61) adjusting the direction of the sound produced by the speaker (64) are provided in an upper chamber (60) of a vehicle headlamp device (29).

In this manner, a cover or a louver for adjusting the magnitude or the direction of sound pressure is placed in front of the horn in the embodiments disclosed in JP-A No. H11-263264 and JP-A No. 2012-162228.

Essentially, the cover or the like is not desirably placed in front of the horn in order to provide a predetermined sound pressure with ease. However, if the cover or the like is not placed on front of the horn, the horn catches the flow of air. Because of this, drag or lift is generated to make the flow of air easily exert an influence.

A technique to adequately provide a sound pressure of a horn and also to be less affected by a flow of air is desired.

SUMMARY AND OBJECTS OF THE INVENTION

An object of an embodiment of the present invention is to provide a technique to adequately provide a sound pressure of a horn and also to be less affected by a flow of air.

According to an embodiment of the present invention, a saddle-ride type vehicle includes a head pipe rotatably supporting a front fork with a main frame extending from the head pipe toward the rear of the vehicle. A horn is supported by the main frame and produces a warning sound. A front cover is provided for laterally covering the horn and the main frame. The front cover includes an outer cover and an inner cover located inward of the outer cover in a vehicle-width direction. The inner cover includes an air guide surface extending in a vehicle-longitudinal direction with the horn being placed at the rear of the air guide surface. The inner cover further includes a relief portion leaning outward in the vehicle-width direction to steer clear of a vehicle forward side of the horn. The inner cover includes a covering provided on a surface contiguous with the air guide surface to cover at least a part of the vehicle forward side of the horn, the covering having a mesh structure.

According to an embodiment of the present invention, the main frame includes a left main frame extending toward the rear of the vehicle while curving leftward in the vehicle-width direction, and a right main frame extending toward the rear of the vehicle while curving rightward in the vehicle-width direction. The horn is placed in a position offset from a centerline of a vehicle body toward either the left or the right in the vehicle-width direction and also in such a manner as to tilt a horn output surface of the horn at a predetermined angle relative to the centerline of the vehicle body. The horn is located rearward and downward of the head pipe to be mounted to either the left main frame or the right main frame through a stay.

According to an embodiment of the present invention, the stay includes a modulator supporter supporting an ABS modulator and a front-cover supporter extending upward of the modulator supporter and supporting the front cover.

According to an embodiment of the present invention, the front-cover supporter supports the inner cover and the outer cover in a co-clamping manner.

According to an embodiment of the present invention, the covering covers at least a part of the relief portion.

According to an embodiment of the present invention, an opening is formed in the inner cover on a vehicle forward side of the covering. The relief portion is placed on a vehicle rearward side of the opening. Either a flow of air is guided from the opening toward the relief portion or the warning sound is guided from the relief portion toward the opening.

According to an embodiment of the present invention, the inner cover includes an inner lower cover and an inner upper cover located upwardly of the inner lower cover. The covering and the opening are placed on the inner lower cover. The relief portion is placed on the inner upper cover. The covering, the opening and the relief portion are combined to form a horn cover.

According to an embodiment of the present invention, the inner cover includes a relief portion leaning outward in the vehicle-width direction to steer clear of the vehicle forward side of the horn. Because, by the relief portion, the warning sound produced by the horn easily flows toward the front of the vehicle, a predetermined sound pressure is easily provided. Also, the inner cover includes a covering that covers at least a part of the vehicle forward side of the horn. Because the covering is formed of part of the surface contiguous with the air guide surface to make the flow of air easily flow from the front of the vehicle toward the rear, drag or lift is not easily generated. As a result, it is possible for the flow of air to exert less influence, enhancing controllability of the vehicle.

According to an embodiment of the present invention, the horn is placed rearward and downward of the head pipe in a position offset from the vehicle centerline to either the left or the right in the vehicle-width direction. As long as the horn is placed in such a position, the inner cover easily covers the horn. Thus, the appearance quality of the vehicle is not easily impaired. Because the horn output surface is placed to be inclined at a predetermined angle toward the body centerline, not much of a flow of air hits directly the horn, reducing the force applied to the horn by the flow of air. As a result, the flow of air is less affected. Thus, a further enhancement in controllability of the vehicle can be achieved.

According to an embodiment of the present invention, the stay to which the horn is mounted includes the modulator supporter and the front-cover supporter. The stay is not designed as a stay dedicated to the horn, and is designed to be capable of supporting a plurality of components mounted thereto. This leads to reduce the component count of the vehicle.

According to an embodiment of the present invention, the front cover supporter is a section of supporting the inner cover and the outer cover in the co-clamping manner. Because the inner cover and the outer cover are supported on the front-cover supporter of the stay, a reduction in component count is made possible as compared with the case of individually providing stays.

According to an embodiment of the present invention, the relief portion is covered with the covering. More specifically, if all of the forward area of the horn is covered with the mesh structure, the sound pressure may possibly be insufficient. In this respect, an embodiment of the present invention provides that the covering covers only a part of the relief portion. More specifically, because the opening is placed forward of the covering, a predetermined sound pressure is ensured as well as the flow of air exerts less influence. Thus, a favorable controllability is achieved.

According to an embodiment of the present invention, the opening and the relief portion are provided on the inner cover. A combination of the opening and the relief portion makes it possible to achieve compatibility between the predetermined sound pressure and the favorable controllability.

According to an embodiment of the present invention, if an opening is placed forward of the covering of the mesh structure, this may be formed of three components, the inner lower cover, the inner upper cover and the covering.

In this respect, in an embodiment of the present invention, the covering and the opening are provided on the inner lower cover and the relief portion is provided on the inner upper cover. With such a structure, the horn cover can be formed of two components in which the covering, the opening and the relief portion are provided. As a result, a reduction in component count is made possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will be described in detail below. In the drawings and embodiments, "up," "down," "front," "rear," "left" and "right" refer to the respective directions as viewed by a rider riding on the motorcycle.

An embodiment according to the present invention is described with reference to the drawings.

Figure 1:
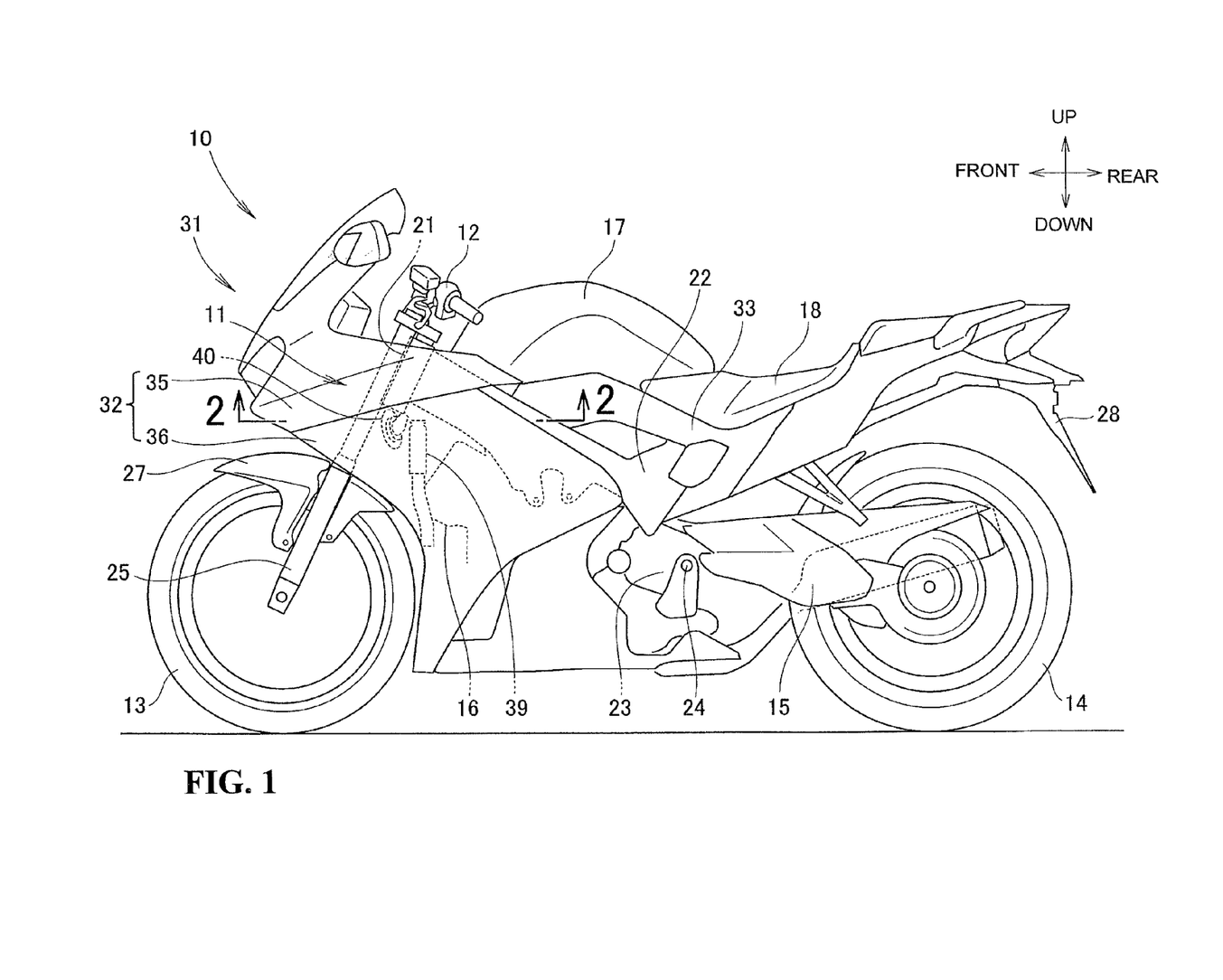
FIG. 1 is a left side view of a motorcycle according to the present invention.

As illustrated in FIG. 1, a motorcycle 10 includes, as main elements, a body frame 11 with a front wheel 13 being steerable through a steering handlebar 12 placed in a front portion of the body frame 11. A rear wheel 14 is placed in a rear lower portion of the body frame 11 to be swingably supported through a swing arm 15. An engine 16 is provided as a power source that is suspended from the body frame 11 between the front wheel 13 and the rear wheel 14. A fuel tank 17 is placed above the engine 16 with a seat 18 extending rearwardly of the fuel tank 17 for being occupied by an occupant wherein in a saddle-ride type vehicle an occupant sits astride the seat 18.

Main elements of the body frame 11 are a head pipe 21 rotatably supporting a front fork 25, a main frame 22 extending from the head pipe 21 toward the rear of the vehicle, and pivot frames 23 extending downward from a rear end of the main frame 22. A pivot shaft 24 is horizontally laid between the pivot frames 23 in the vehicle-width direction. A front end of the swing arm 15 supporting the rear wheel 14 is supported by the pivot shaft 24. The front fork 25 is provided integrally with the steering handlebar 12 and supports the front wheel 13. A front fender 27 for guard against dirt is provided above the front wheel 13, while a rear fender 28 for guard against dirt is provided above the rear wheel 14.

The body frame 11 and a front part of the vehicle body are covered with a body cover 31. The body cover 31 has a front cover 32 and side covers 33 placed rearwardly of the front cover 32. The front cover 32 includes a first front cover 35 and a second front cover 36 placed contiguously rearwardly of the first front cover 35. A horn 40 producing a warning sound is supported at a position inwardly of the second front cover 36 in the vehicle-width direction by the main frame 22. In short, the horn 40 is covered on one side with the front cover 32.

Figure 2:
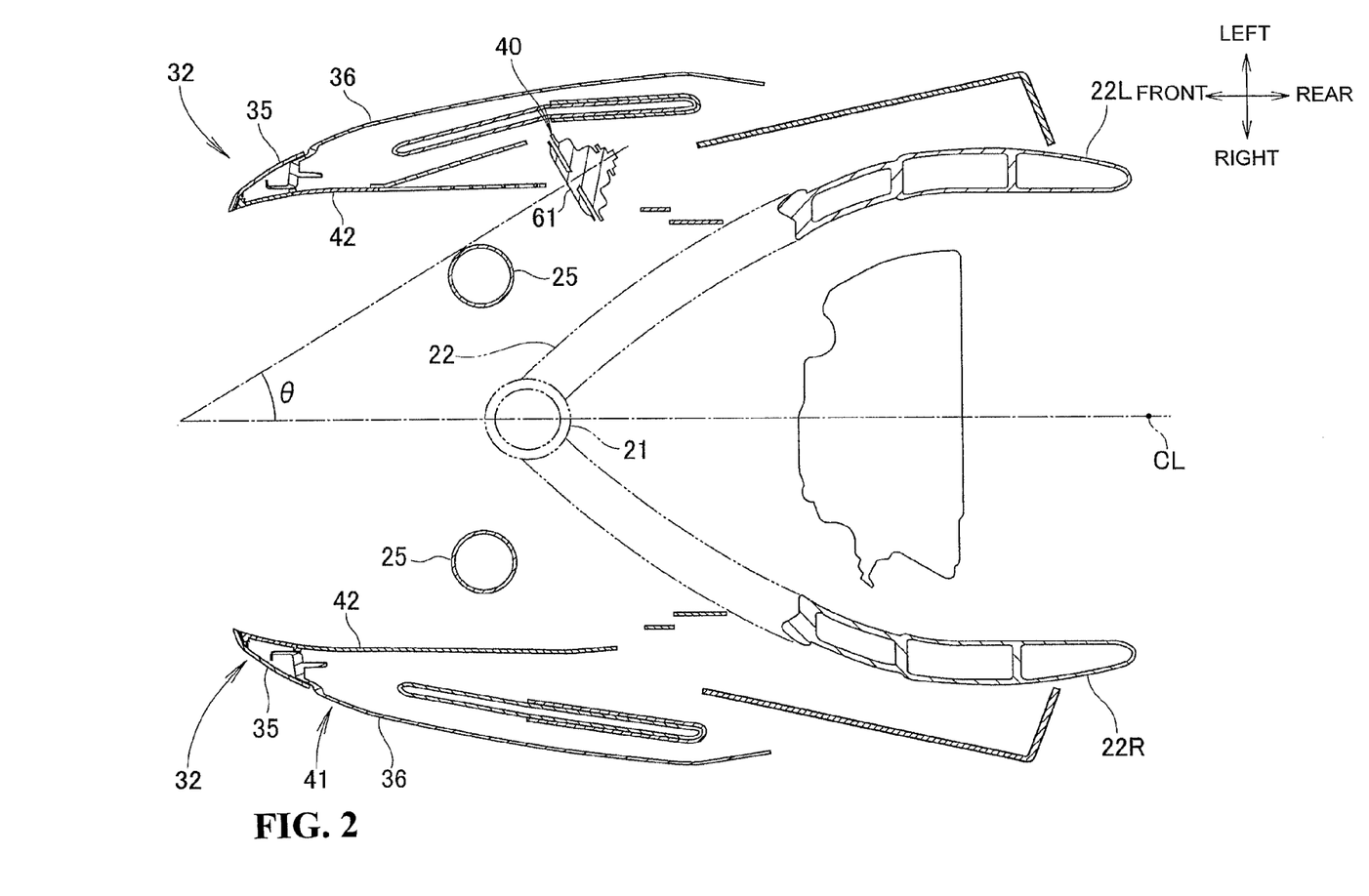
FIG. 2 is a sectional view taken along line 2-2 of FIG. 1.

As illustrated in FIG. 2, the main frame 22 includes a left main frame 22L extending toward the rear of the vehicle while curving to the left in the vehicle-width direction, and a right main frame 22R extending toward the rear of the vehicle while curving to the right in the vehicle-width direction. The front cover 32 covering the main frame 22 includes an outer cover 41 and an inner cover 42 located inward of the outer cover 41 in the vehicle-width direction. Note that the horn 40 is placed in a position offset from the centerline CL of the vehicle body toward the left in the vehicle-width direction and also in such a manner so as to tilt a horn output surface 61 of the horn 40 at a predetermined angle θ relative to the body centerline CL.

A stay 45 for supporting the horn 40 will be described hereinafter.

Figure 3:
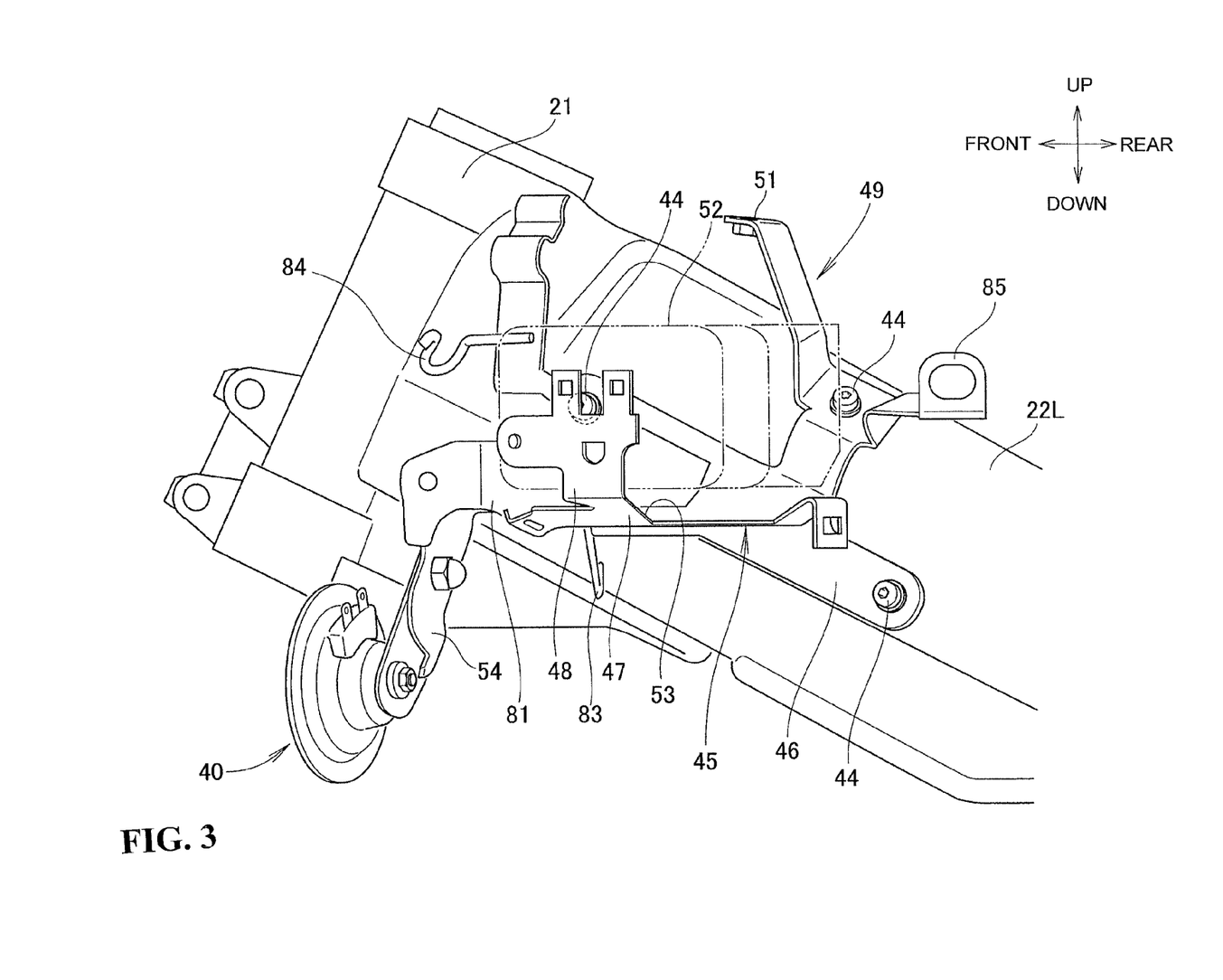
FIG. 3 is a side view of a front portion of a body frame, illustrating the structure of mounting a horn.
Figure 4:
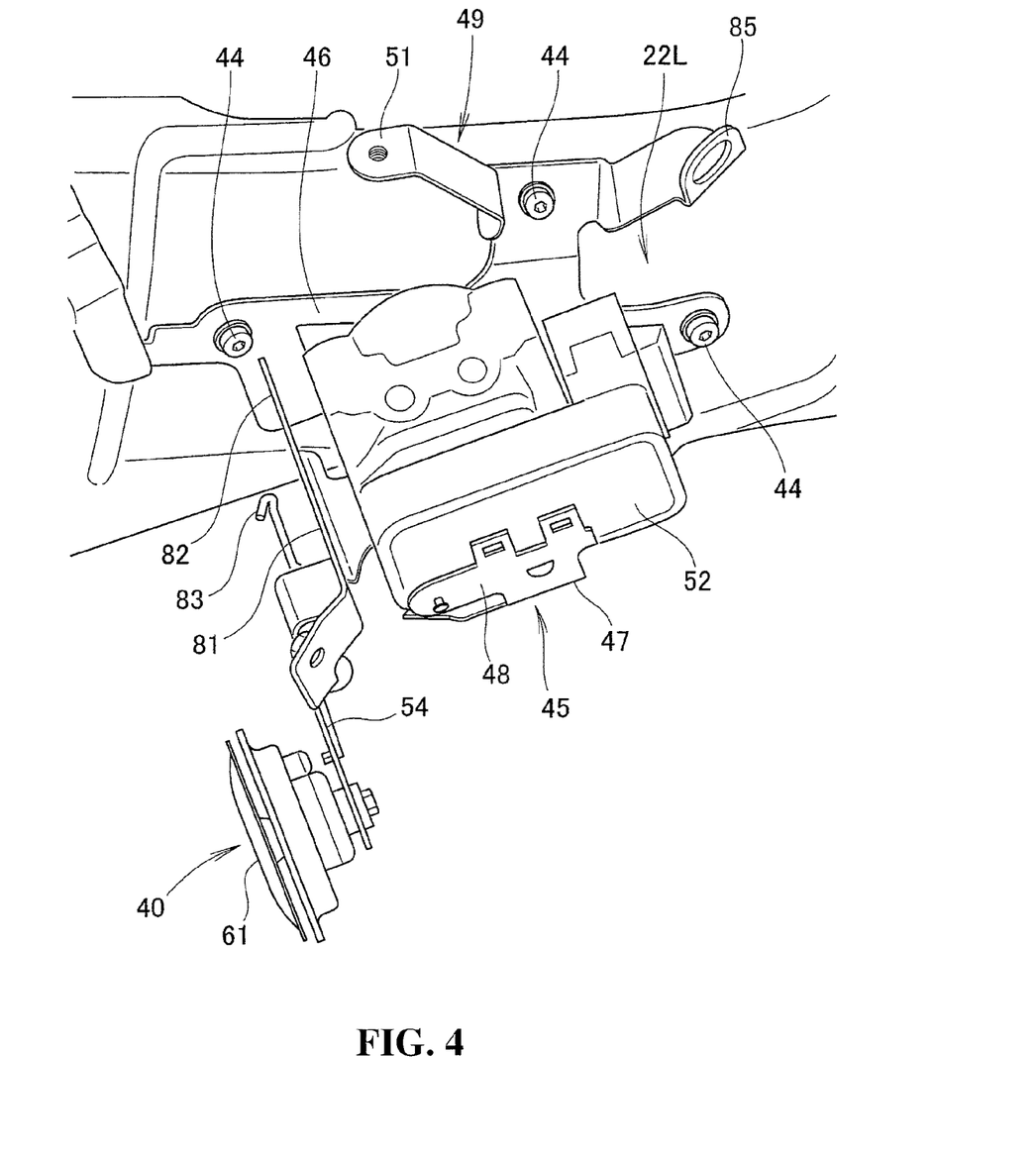
FIG. 4 is a perspective view of the front portion of the body frame, illustrating the structure of mounting a horn.

As illustrated in FIG. 3 and FIG. 4, a stay 45 is attached through fastening members 44 onto an outer surface of the left main frame 22L extending from the head pipe 21. The stay 45 has an inner piece 46 abutting on the outer surface of the left main frame 22L to allow the fastening members 44 to pass through, a bottom piece 47 extendingoutwardly from a lower end of the inner piece 46 in the vehicle-width direction, and an outer piece 48 extending upward and downward from an outer end of the bottom piece 47 in the vehicle-width direction. The inner piece 46, the bottom piece 47 and the outer piece 48 of the stay 45 form a modulator supporter 53 supporting an ABS modulator 52. An upward extension 49 is additionally attached to the inner piece 46 of the stay 45 to extend upward to form a front-cover supporter 51 supporting the front cover 32, which will be described later.

In addition, a front piece 81 protrudes upwardly from the bottom piece 47. A horn supporter 54 to which the horn 40 is mounted to face outwardly in the vehicle-width direction is attached to the front piece 81. The horn 40 is located rearwardly and downwardly of the head pipe 21 and is attached through the stay 45 to the left main frame 22L. The horn 40 has a horn output surface 61.

Note that, in a manner similar to this, the horn can be attached through a stay to the right main frame, in a position rearwardly and downwardly of the head pipe without any problem.

An upper portion of the front piece 81 of the stay 45 has an assist piece 82 extending inwardly in the vehicle-width direction to be joined to the inner piece 46. The front piece 81 supporting the horn 40 is reinforced with the assist piece 82. A harness supporter 83 is joined to the front piece 81. Also, a harness guide 84 is joined to the inner piece 46. Further, an outer-cover supporter 85 supporting the outer cover 41 (see FIG. 2) is attached to the upward extension 49. In other words, the harness supporter 83, the harness guide 84 and the outer-cover supporter 85 are provided integrally with the stay 45, so that a reduction in component count can be achieved in comparison with the case of an individual mounting of the harness supporter 83, the harness guide 84 and the outer-cover supporter 85.

Figure 5:
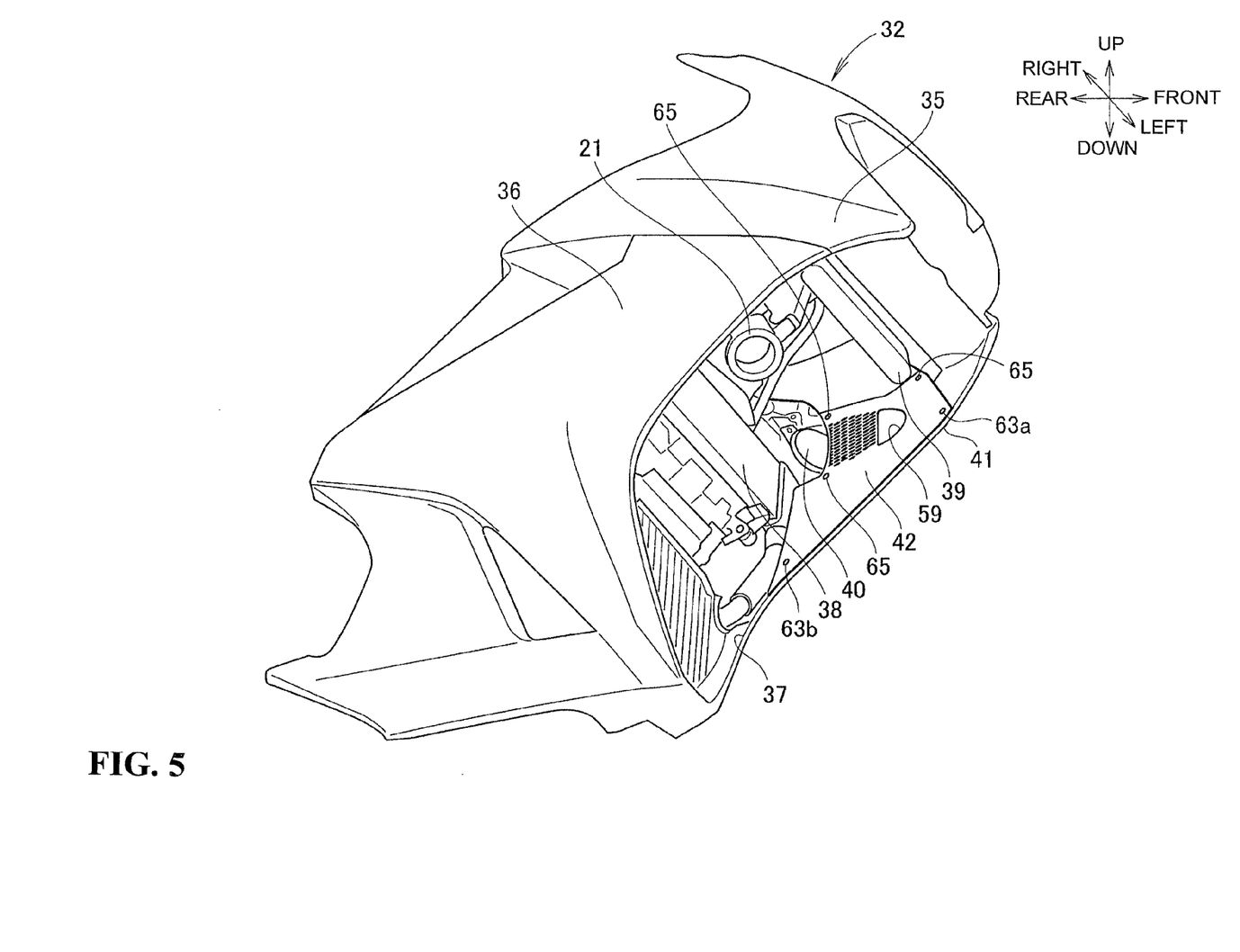
FIG. 5 is a perspective view illustrating the structure of the horn and its surroundings.
Figure 6:
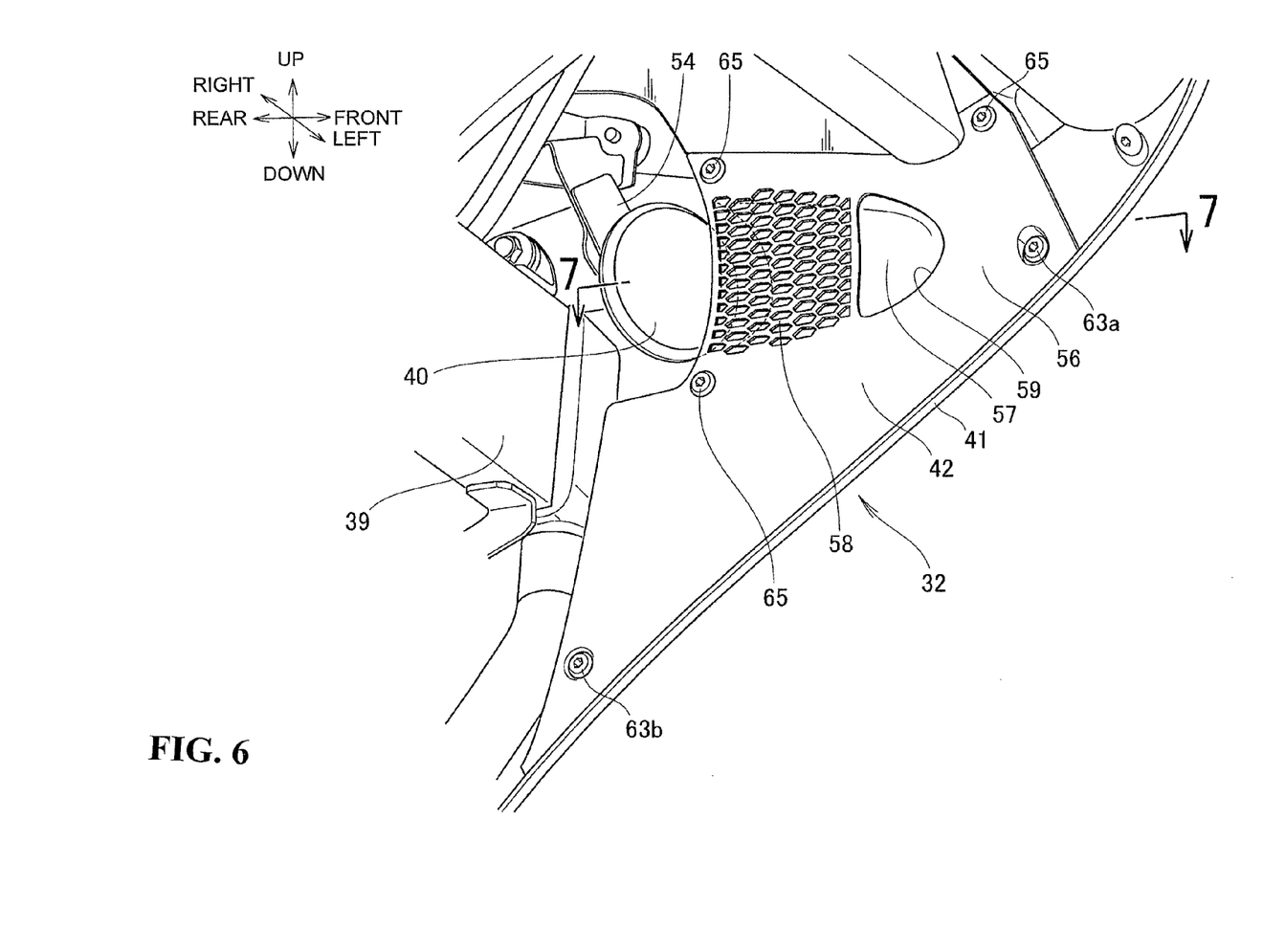
FIG. 6 is an enlarged view of an essential part of FIG. 5.

As illustrated in FIG. 5 and FIG. 6, the structure of the horn 40 and its surrounding when viewed from the bottom right of the vehicle toward the up left will be described. As illustrated in FIG. 5, the horn 40 is placed such that a part of the horn 40 is covered with the inner cover 42 which is a structural element of the front cover 32. A front opening 37 for the admission of a flow of air is formed in the front cover 32 in the front of the vehicle. A radiator unit 38 and an oil cooler unit 39 are placed in the front opening 37.

The inner cover 42 placed around the horn 40 is described hereinafter.

As illustrated in FIG. 6, the front cover 32 includes the outer cover 41 and the inner cover 42 located inward of the outer cover 41 in the vehicle-width direction. The inner cover 42 includes an air guide surface 56 extending in the vehicle-longitudinal direction to guide a flow of air toward the rear of the vehicle. The horn 40 is placed at the back of the air guide surface 56. The front and rear sides of the lower end of the inner cover 42 are attached to the vehicle body (the outer cover 41) with fastening members 63*a*, 63*b*.

Figure 7:
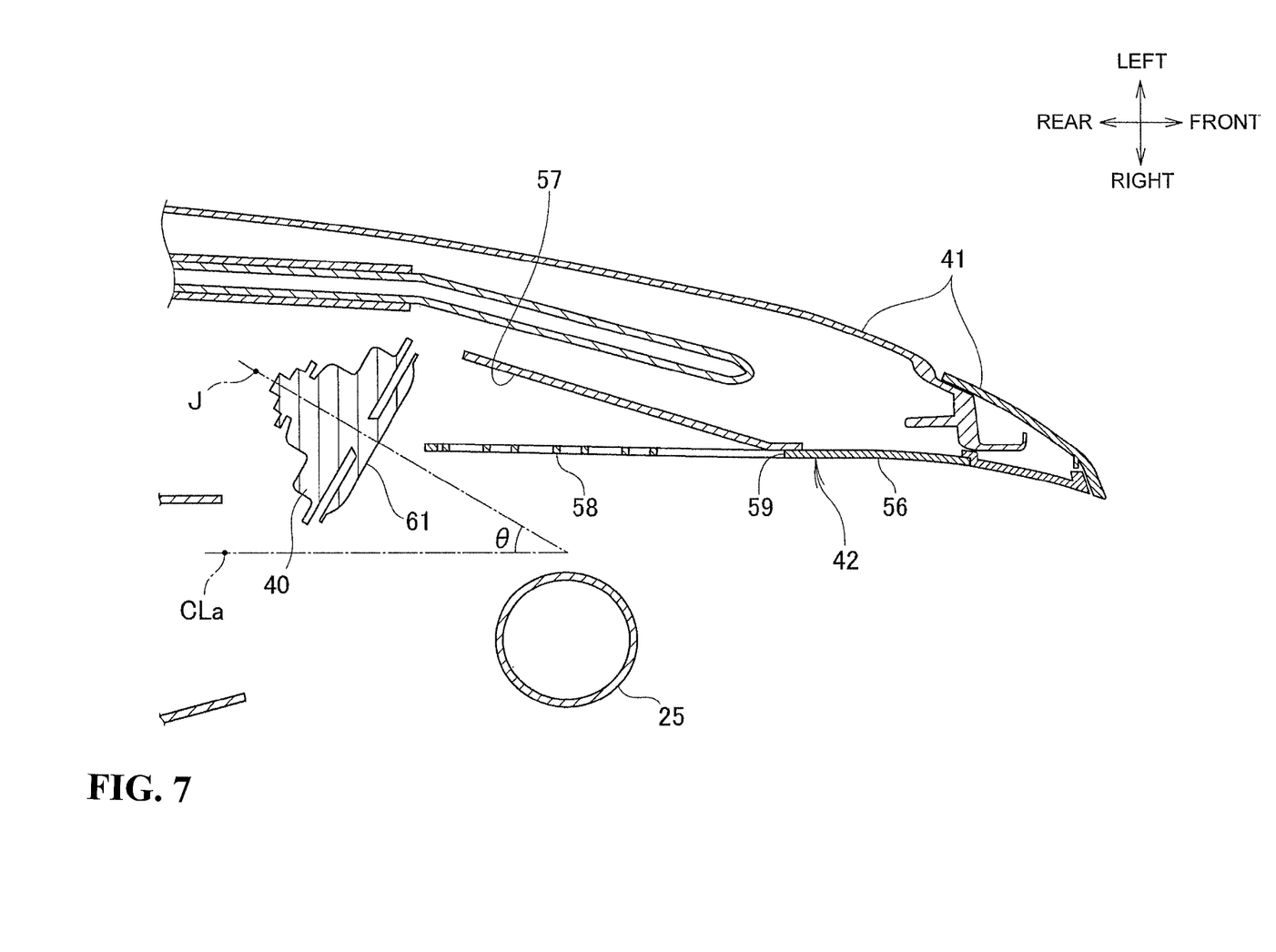
FIG. 7 is a sectional view taken along line 7-7 of FIG. 6.

As illustrated in FIG. 7, the inner cover 42 further includes a relief portion 57 leaning outwardly in the vehicle-width direction to steer clear of the vehicle forward side of the horn 40. A covering 58 is provided on a surface contiguous with the air guide surface 56 to cover at least a part of the vehicle forward side of the horn 40. The covering 58 has a mesh structure. The opening 59 is provided in the inner cover 42 on the vehicle forward side of the covering 58, while the relief portion 57 is placed on the vehicle rear side of the opening 59. The covering 58 covers at least a part of the relief portion 57.

The air guide surface 56 extends in the vehicle-longitudinal direction which is the same as the body centerline CL (see FIG. 2). An axis J extending perpendicularly to the horn output surface 61 is placed to be inclined at a predetermined angle θ toward a line CLa parallel to the body centerline CL. Since, in this manner, the horn output surface 61 is inclined at the angle θ toward the body centerline CL, a significant reduction in the force received from the flow of air by the horn 40 can be achieved as compared with, for example, the case of placing the horn 40 such that the orientation of the axis J perpendicular to the horn output surface 61 is parallel to the body centerline CL. As a result, the controllability of the vehicle is enhanced.

The inner cover 42 will be described hereinafter.

Figure 8:
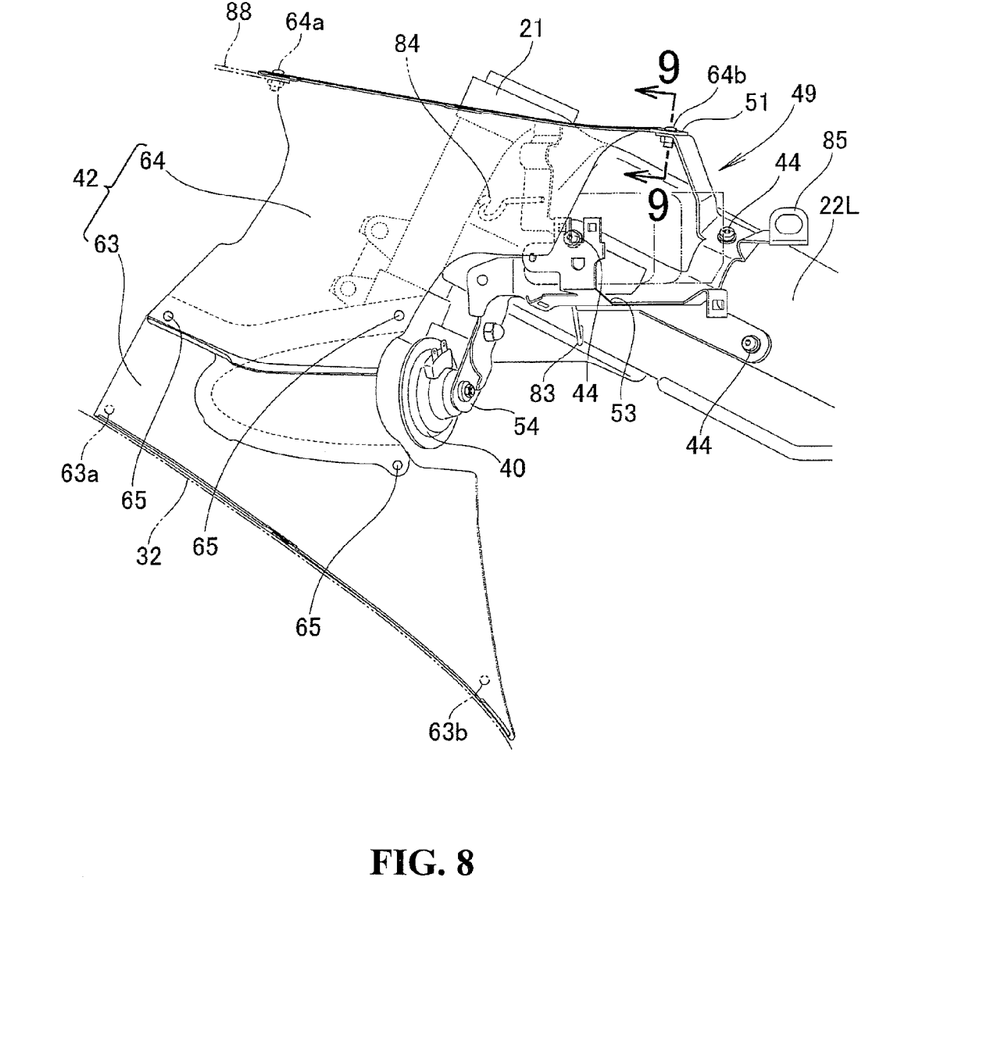
FIG. 8 is a side view illustrating the co-clamping structure of an inner cover and a front cover.

As illustrated in FIG. 8, the inner cover 42 is placed outward of the horn 40 attached to the stay 45 in the vehicle-width direction. The inner cover 42 includes an inner lower cover 63 and an inner upper cover 64 located on the inner lower cover 63. The inner lower cover 63 and the inner upper cover 64 are connected together by a plurality of grommets 65. An upper end of the inner cover 42 is fastened to the upward extension 49 which extends upwardly of the modulator supporter 53 to form the front-cover supporter 51 supporting the front cover 32.

The co-clamping structure of the inner cover 42 and the outer cover 41 on the front-cover supporter 51 will be described hereinafter.

Figure 9:
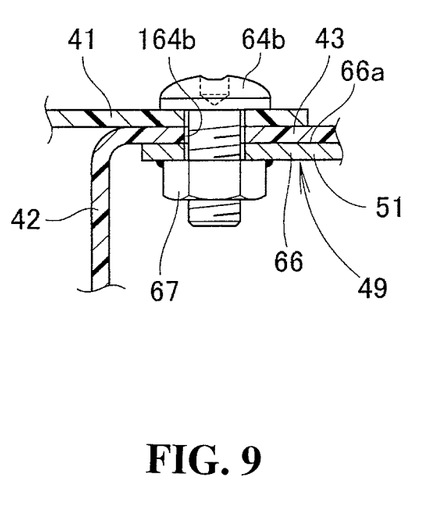
FIG. 9 is a sectional view taken along line 9-9 of FIG. 8.

As illustrated in FIG. 9, a nut 67 is welded onto a lower surface of a seat base 66 of the front-cover supporter 51. For assembly, a seat base 43 of the inner cover 42 is placed on an upper surface 66*a* of the seat base 66 of the front-cover supporter 51. Then, the outer cover 41 is placed on the seat base 43 of the inner cover 42. Then, a fastening member 64*b* is passed from above to clamp the inner cover 42 and the outer cover 41 together to be supported.

The front-cover supporter 51 is a section for supporting the inner cover 42 and the outer cover 41 in a co-clamping manner. Because the inner cover 42 and the outer cover 41 are supported by the front-cover supporter 51 of the stay 45, a reduction in the component count can be achieved in comparison with the case of mounting individually stays to the vehicle body.

Figure 10A:
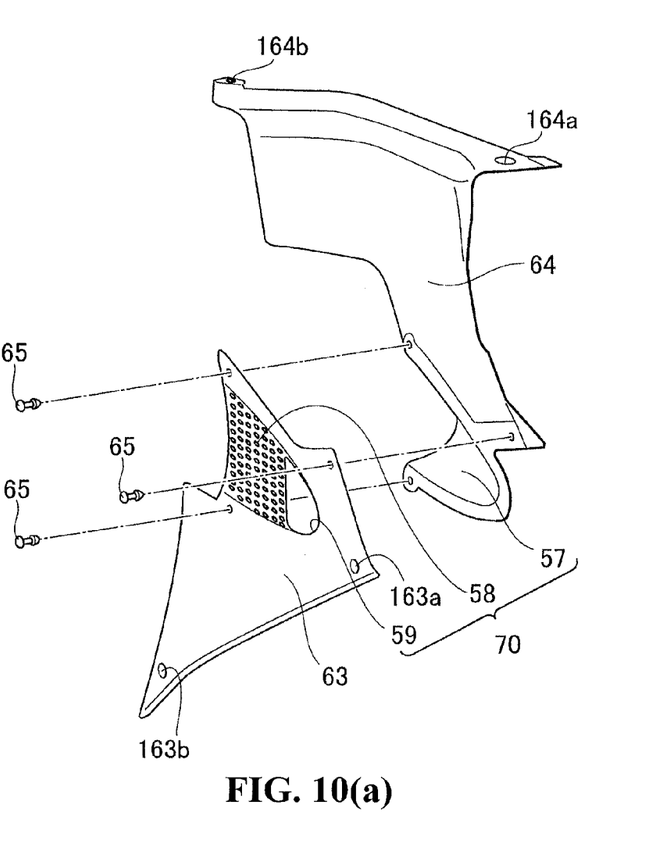
FIGS. 10(a) and 10(b) are exploded views illustrating the assembly structure of an inner lower cover and an inner upper cover.
Figure 10B:
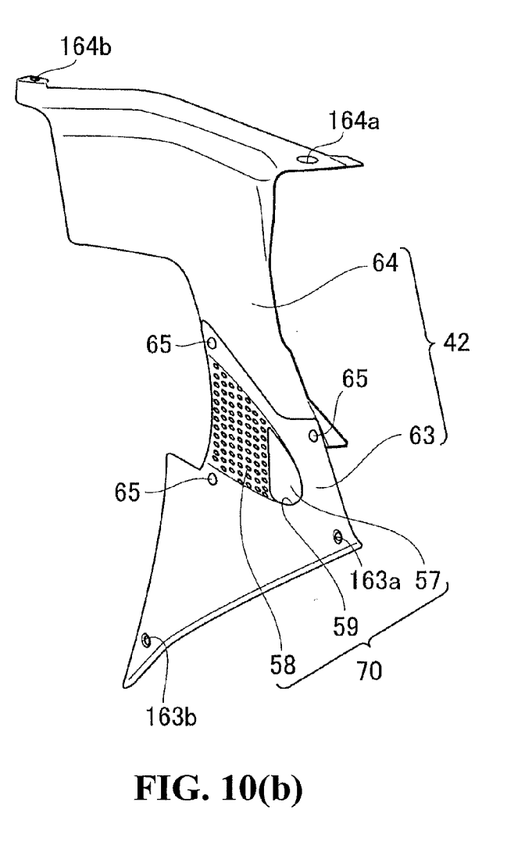

FIG. 10(*a*) illustrates the separated state of the inner lower cover 63 and the inner upper cover 64 before being integrated together, while FIG. 10(*b*) illustrates the integrated state of the inner lower cover 63 and the inner upper cover 64. FIGS. 10(*a*) and 10(*b*) view the inner cover 42 from inside in the vehicle-width direction on the opposite side to FIG. 8.

In FIG. 10(*a*), in the inner cover 42 including the inner lower cover 63 and the inner upper cover 64, the covering 58 and the opening 59 are provided in the inner lower cover 63. The relief portion 57 is provided in the inner upper cover 64. The covering 58, the opening 59 and the relief portion 57 are combined to form a horn cover 70.

For assembly, an upper portion of the inner lower cover 63 is placed on a lower portion of the inner upper cover 64, and then the grommets 65 are inserted from the inside to the outside in the vehicle-width direction.

In FIG. 10(*b*), the grommets 65 are inserted so that the inner lower cover 63 is connected to the inner upper cover 64. The inner upper cover 64 has fastening holes 164*a*, 164*b* formed in its front upper end and its rear upper end to be fastened to the vehicle body. The inner lower cover 63 has fastening holes 163*a*, 163*b* formed in its front lower end and its rear lower end to be fastened to the vehicle body. In the inner cover 42 formed by connecting the inner lower cover 63 to the inner upper cover 64, the fastening holes 163*a*, 163*b*, 164a, 164b formed in the upper end and the lower end are used to attach the inner cover 42 to the vehicle body. As described earlier, the inner cover 42 and the outer cover 41 are co-clamped to the front-cover supporter 51 of the stay by the fastening members 64b.

Referring to FIG. 5 and FIG. 8 together, the lower end of the inner cover 42 is attached to the vehicle body by inserting the fastening members 63a, 63b through the fastening holes 163a, 163b, respectively. The upper end of the inner cover 42 is attached to the vehicle body by inserting the fastening member 64b through the fastening hole 164b, and also to the vehicle body (a meter cover 88) by inserting the fastening member 64a through the fastening hole 164a.

In the assembling process, initially, the inner lower cover 63 and the inner upper cover 64 are integrally connected with the grommets 65 as described earlier. Then, the fastening holes 164a, 164b formed in the upper end of the integrated inner cover 42 are attached to the vehicle body by the fastening members 64a, 64b. Finally, the fastening holes 163a, 163b formed in the lower end of the inner cover 42 are attached to the vehicle body by the fastening members 63a, 63b.

In the horn cover, if an opening is formed in front of the covering of the mesh structure, the horn cover is formed of three components, the inner lower cover, the inner upper cover and the covering.

In this respect, in an embodiment of the present invention, the covering 58 and the opening 59 are provided in the inner lower cover 63, while the relief portion 57 is provided in the inner upper cover 64. With such structure, the horn cover 70 can be formed of two components. As a result, a reduction in component count can be achieved.

Next, the operation of the aforementioned motorcycle will be described.

Figure 11A:
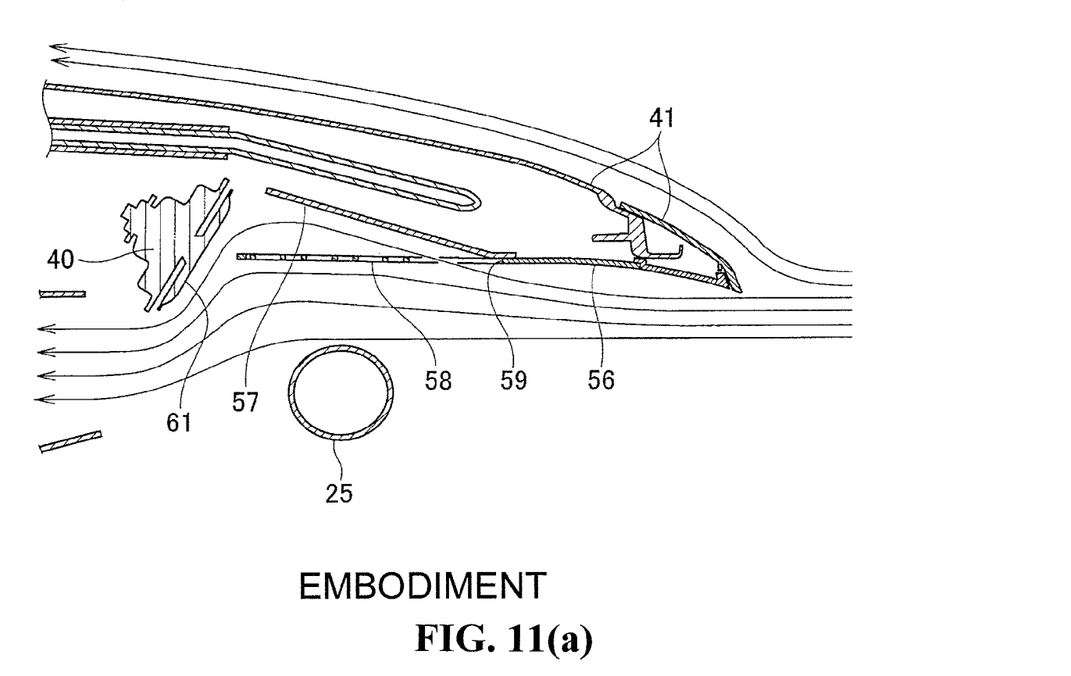
FIG. 11(a) is an action explanatory diagram of the surroundings of the horn according to an example of the present invention and FIG. 11(b) is a comparative example.

As illustrated in an example of FIG. 11(a), the inner cover 42 includes the relief portion 57 leaning outwardly in the vehicle-width direction to steer clear of the vehicle forward side of the horn 40. In addition, the opening 59 is formed in front of the relief portion 57, so that a horn sound smoothly flows from the relief portion 57 to the opening 59.

In an embodiment of the present invention, the horn sound produced by the horn 40 easily flows forward of the vehicle because of the relief portion 57 and the opening 59. As a result, a predetermined sound pressure is easily provided, facilitating the propagation of horn sounds to traffic outside of the vehicle.

The inner cover 42 includes the covering 58 covering at least a part of the vehicle forward side of the horn 40. The covering 58 formed on the surface contiguous with the air guide surface 56 effects a smooth flow of flow of air from the front of the vehicle toward the rear.

Figure 11B:
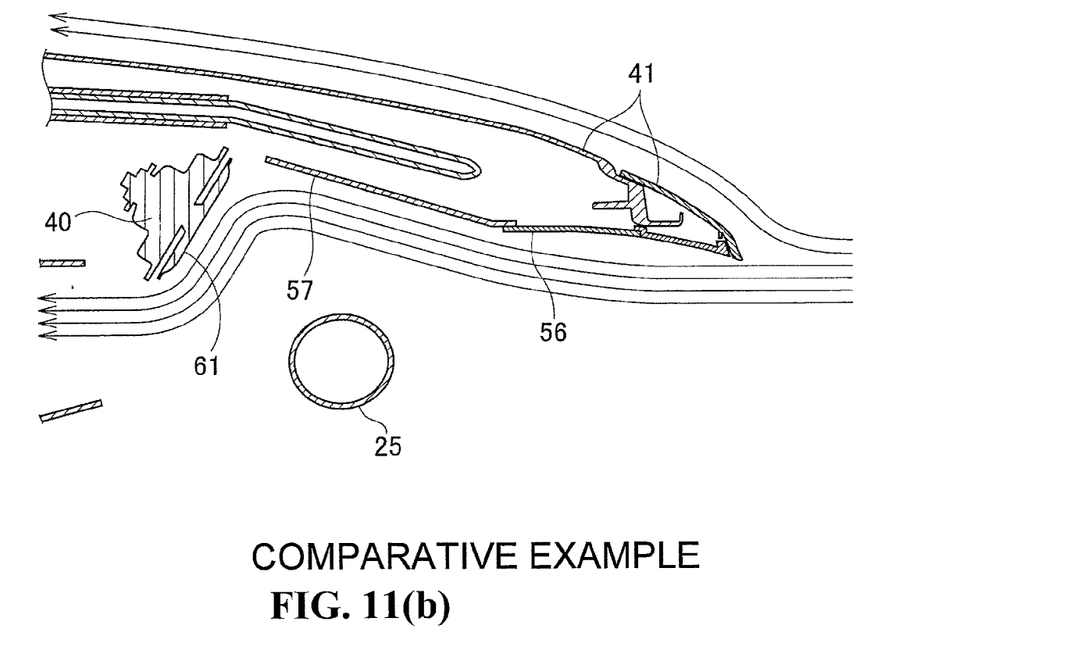

As shown in the comparison example of FIG. 11(b), if the covering 58 is not formed, flow of air flows along the relief portion 57, making it easy for the flow of air to directly hit the horn output surface 61. Therefore, as shown in FIG. 11(b), the flow of air hits the horn output surface 61, so that a larger force acts on the horn 40 as compared with the example in FIG. 11(a). If a larger force acts on the horn 40, drag or lift is generated, in particular, while the vehicle travels at high speeds. Thus, the flow of air easily exerts an influence.

As illustrated in FIG. 11(a), most of the flow of air easily flows, in the same direction as the orientation of the air guide surface 56, smoothly from the front of the vehicle to the rear along the covering 58 extending parallel to the vehicle centerline CL (see FIG. 2). Because the flow of air easily flows rearwardly from the front of the vehicle, drag or lift is not easily generated, so that the flow of air less affects, as compared with the case when the covering 58, is not provided contiguously with the air guide surface 56, resulting in an enhancement in controllability of the vehicle. In addition, because of the opening 59 is placed forward of the covering 58, the compatibility between the provision of a predetermined sound pressure and favorable controllability is feasible.

As illustrated in FIG. 2, the horn 40 is placed rearwardly and downwardly of the head pipe 21 in a position offset from the vehicle centerline CL to the left in the vehicle-width direction. As long as the horn 40 is placed in such a position, the horn 40 is covered with the inner cover 42. Thus, the appearance quality of the vehicle is not easily impaired. As described earlier, because the horn output surface 61 is placed to be inclined at a predetermined angle toward the body centerline CL, not much flow of air hits directly the horn 40, reducing the force applied to the horn 40 by the flow of air. As a result, a further enhancement in controllability of the vehicle can be achieved.

As illustrated in FIG. 3, the stay 45 to which the horn 40 is mounted includes the modulator supporter 53 and the front-cover supporter 51. The stay 45 is not designed as a stay dedicated to a horn, and is designed to be capable of supporting a plurality of components mounted thereto. Thus, a reduction in the component count of the vehicle is achieved.

An alternative to FIG. 5 will be described hereinafter.

Figure 12:
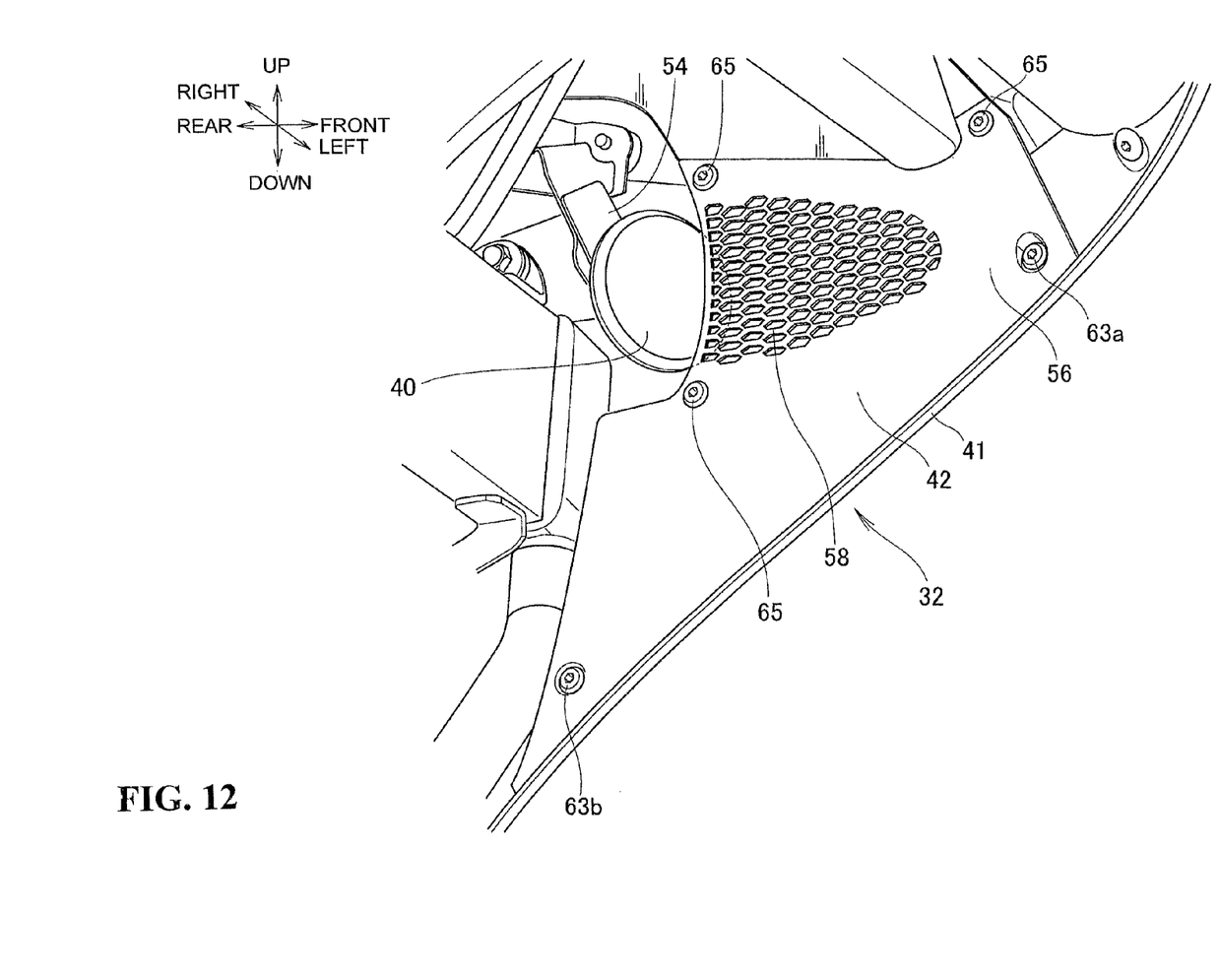
FIG. 12 is a diagram of another example relating to FIG. 6.

As illustrated in FIG. 12, the covering 58 with the mesh structure provided in the inner lower cover 63 extends to the air guide surface 56. A difference from FIG. 5 is that the covering 58 covers a range extending to the opening 59 provided in the inner cover 42 on the vehicle forward side of the covering 58. Apart from this, there is substantially no difference.

The present invention is applied to a motorcycle in the embodiment, but is applicable to a saddle-ride type three-wheeled vehicle and can be applied to a general saddle-ride type vehicle without any problem.

The present invention is suitable for a motorcycle including a horn in a forward part of the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride vehicle, comprising:
a head pipe rotatably supporting a front fork;
a main frame extending from the head pipe toward a rear of the vehicle;
a horn supported by the main frame for producing a warning sound; and
a front cover laterally covering the horn and the main frame;
wherein the front cover includes an outer cover and an inner cover located inwardly of the outer cover in a vehicle-width direction;
the inner cover includes an air guide surface extending in a vehicle-longitudinal direction, the horn being placed at a rear of the air guide surface;
the inner cover further includes a relief portion leaning outwardly in the vehicle-width direction to steer clear of a vehicle forward side of the horn; and
the inner cover includes a covering provided on a surface contiguous with the air guide surface to cover at least a part of the vehicle forward side of the horn, the covering having a mesh structure.

2. The saddle-ride vehicle according to claim 1, wherein the main frame includes a left main frame extending toward the rear of the vehicle while curving in a left direction in the vehicle-width direction, and a right main frame extending toward the rear of the vehicle while curving in a right direction in the vehicle-width direction;
the horn is placed in a position offset from a centerline of a vehicle body toward either the left or the right in the vehicle-width direction so as to tilt a horn output surface of the horn at a predetermined angle relative to the centerline of the vehicle body; and
the horn is located rearwardly and downwardly of the head pipe to be mounted to either the left main frame or the right main frame through a stay.

3. The saddle-ride vehicle according to claim 2, wherein the stay includes a modulator supporter supporting an ABS modulator and a front-cover supporter extending upwardly of the modulator supporter and supporting the front cover.

4. The saddle-ride vehicle according to claim 3, wherein the front-cover supporter supports the inner cover and the outer cover in a co-clamping manner.

5. The saddle-ride vehicle according to claim 1, wherein the covering covers at least a part of the relief portion.

6. The saddle-ride vehicle according to claim 2, wherein the covering covers at least a part of the relief portion.

7. The saddle-ride vehicle according to claim 3, wherein the covering covers at least a part of the relief portion.

8. The saddle-ride vehicle according to claim 4, wherein the covering covers at least a part of the relief portion.

9. The saddle-ride vehicle according to claim 1, wherein an opening is formed in the inner cover on a vehicle forward side of the covering;
the relief portion is placed on a vehicle rearward side of the opening; and
either a flow of air is guided from the opening toward the relief portion or the warning sound is guided from the relief portion toward the opening.

10. The saddle-ride vehicle according to claim 2, wherein an opening is formed in the inner cover on a vehicle forward side of the covering;
the relief portion is placed on a vehicle rearward side of the opening; and
either a flow of air is guided from the opening toward the relief portion or the warning sound is guided from the relief portion toward the opening.

11. The saddle-ride vehicle according to claim 3, wherein an opening is formed in the inner cover on a vehicle forward side of the covering;
the relief portion is placed on a vehicle rearward side of the opening; and
either a flow of air is guided from the opening toward the relief portion or the warning sound is guided from the relief portion toward the opening.

12. The saddle-ride vehicle according to claim 4, wherein an opening is formed in the inner cover on a vehicle forward side of the covering;
the relief portion is placed on a vehicle rearward side of the opening; and
either a flow of air is guided from the opening toward the relief portion or the warning sound is guided from the relief portion toward the opening.

13. The saddle-ride vehicle according to claim 5, wherein an opening is formed in the inner cover on a vehicle forward side of the covering;
the relief portion is placed on a vehicle rearward side of the opening; and
either a flow of air is guided from the opening toward the relief portion or the warning sound is guided from the relief portion toward the opening.

14. The saddle-ride vehicle according to claim 9, wherein the inner cover includes an inner lower cover and an inner upper cover located upward of the inner lower cover;
the covering and the opening are placed on the inner lower cover;
the relief portion is placed on the inner upper cover; and
the covering, the opening and the relief portion are combined to form a horn cover.

15. A saddle-ride vehicle, comprising:
a main frame extending from a front of the vehicle to a rear of the vehicle;
a horn supported by the main frame for producing a warning sound; and
a front cover laterally covering the horn and the main frame, said front cover comprising:
an outer cover and an inner cover located inwardly of the outer cover in a vehicle-width direction;
said inner cover includes an air guide surface extending in a vehicle-longitudinal direction, the horn being placed at a rear of the air guide surface;
the inner cover further includes a relief portion leaning outwardly in the vehicle-width direction to steer clear of a vehicle forward side of the horn; and
the inner cover includes a covering provided on a surface contiguous with the air guide surface to cover at least a part of the vehicle forward side of the horn, the covering having a mesh structure.

16. The saddle-ride vehicle according to claim 15, wherein the main frame includes a left main frame extending toward the rear of the vehicle while curving in a left direction in the vehicle-width direction, and a right main frame extending toward the rear of the vehicle while curving in a right direction in the vehicle-width direction;
the horn is placed in a position offset from a centerline of a vehicle body toward either the left or the right in the vehicle-width direction so as to tilt a horn output surface of the horn at a predetermined angle relative to the centerline of the vehicle body; and
the horn is located rearwardly and downwardly of the head pipe to be mounted to either the left main frame or the right main frame through a stay.

17. The saddle-ride vehicle according to claim 16, wherein the stay includes a modulator supporter supporting an ABS modulator and a front-cover supporter extending upwardly of the modulator supporter and supporting the front cover.

18. The saddle-ride vehicle according to claim 17, wherein the front-cover supporter supports the inner cover and the outer cover in a co-clamping manner.

19. The saddle-ride vehicle according to claim 15, wherein the covering covers at least a part of the relief portion.

20. The saddle-ride vehicle according to claim 15, wherein an opening is formed in the inner cover on a vehicle forward side of the covering;
the relief portion is placed on a vehicle rearward side of the opening; and
either a flow of air is guided from the opening toward the relief portion or the warning sound is guided from the relief portion toward the opening.

* * * * *